(12) United States Patent
Chen

(10) Patent No.: US 10,963,813 B2
(45) Date of Patent: Mar. 30, 2021

(54) DATA SOVEREIGNTY COMPLIANT MACHINE LEARNING

(71) Applicant: Cisco Technology, Inc., San Jose, CA (US)

(72) Inventor: Eric Chen, Palo Alto, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 1007 days.

(21) Appl. No.: 15/582,089

(22) Filed: Apr. 28, 2017

(65) Prior Publication Data
US 2018/0314981 A1    Nov. 1, 2018

(51) Int. Cl.
G06N 20/00    (2019.01)
G06F 9/50    (2006.01)

(52) U.S. Cl.
CPC .......... *G06N 20/00* (2019.01); *G06F 9/5072* (2013.01)

(58) Field of Classification Search
CPC .............................. G06F 9/5072; G06N 20/00
See application file for complete search history.

(56) References Cited

U.S. PATENT DOCUMENTS

| | | | |
|---|---|---|---|
| 5,185,848 A | 2/1993 | Aritsuka et al. |
| 5,917,537 A | 6/1999 | Lightfoot et al. |
| 5,970,064 A | 10/1999 | Clark et al. |
| 6,023,606 A | 2/2000 | Monte et al. |
| 6,115,393 A | 9/2000 | Engel et al. |
| 6,298,351 B1 | 10/2001 | Castelli et al. |
| 6,456,624 B1 | 9/2002 | Eccles et al. |
| 6,597,684 B1 | 7/2003 | Gulati et al. |
| 6,697,325 B1 | 2/2004 | Cain |
| 6,721,899 B1 | 4/2004 | Narvaez-Guarnieri et al. |

(Continued)

FOREIGN PATENT DOCUMENTS

CN        102004671        3/2013

OTHER PUBLICATIONS

Aluisio et al., "Evaluating Progression of Alzheimer's Disease by Regression and Classification Methods in a Narrative Language Test in Portuguese", Jun. 21, 2016, Lecture Notes in Computer Science, vol. 9727, pp. 109-114, (Year: 2016).*

(Continued)

*Primary Examiner* — Kamran Afshar
*Assistant Examiner* — Brent Johnston Hoover
(74) *Attorney, Agent, or Firm* — Polsinelli PC (57) ABSTRACT

The subject disclosure relates to systems for managing the deployment and updating of incremental machine learning models across multiple geographic sovereignties. In some aspects, systems of the subject technology are configured to perform operations including: receiving a first machine learning model via a first coordination agent, the first machine learning model based on a first training data set corresponding with a first sovereign region, sending the first machine learning model to a second coordination agent in a second sovereign region, wherein the second sovereign region is different from the first sovereign region, and receiving a second machine learning model from the second coordination agent, wherein the second machine learning model is based on updates to the first machine learning model using a second training data set corresponding with the second sovereign region. Methods and machine-readable media are also provided.

20 Claims, 9 Drawing Sheets

(56) References Cited

U.S. PATENT DOCUMENTS

| | | |
|---|---|---|
| 6,816,464 B1 | 11/2004 | Scott et al. |
| 6,894,714 B2 | 5/2005 | Gutta et al. |
| 6,954,617 B2 | 10/2005 | daCosta |
| 7,185,077 B1 | 2/2007 | O'Toole et al. |
| 7,453,864 B2 | 11/2008 | Kennedy et al. |
| 7,496,650 B1 | 2/2009 | Previdi et al. |
| 7,826,372 B1 | 11/2010 | Mabe et al. |
| 7,826,400 B2 | 11/2010 | Sackauchi |
| 7,848,340 B2 | 12/2010 | Sackauchi et al. |
| 7,995,464 B1 | 8/2011 | Croak et al. |
| 8,059,557 B1 | 11/2011 | Sigg et al. |
| 8,063,929 B2 | 11/2011 | Kurtz et al. |
| 8,154,583 B2 | 4/2012 | Kurtz et al. |
| 8,274,893 B2 | 9/2012 | Bansal et al. |
| 8,385,355 B1 | 2/2013 | Figueira et al. |
| 8,489,765 B2 | 7/2013 | Vasseur et al. |
| 8,620,840 B2 | 12/2013 | Newnham et al. |
| 8,630,291 B2 | 1/2014 | Shaffer et al. |
| 8,634,314 B2 | 1/2014 | Banka et al. |
| 8,638,778 B2 | 1/2014 | Lee et al. |
| 8,707,194 B1 | 4/2014 | Jenkins et al. |
| 8,767,716 B2 | 7/2014 | Trabelsi et al. |
| 8,774,164 B2 | 7/2014 | Klein et al. |
| 8,842,161 B2 | 9/2014 | Feng et al. |
| 8,856,584 B2 | 10/2014 | Matsubara |
| 8,862,522 B1 | 10/2014 | Jaiswal et al. |
| 8,880,477 B2 | 11/2014 | Barker et al. |
| 8,942,085 B1 | 1/2015 | Pani et al. |
| 8,948,054 B2 | 2/2015 | Kreeger et al. |
| 8,982,707 B2 | 3/2015 | Moreno et al. |
| 9,137,119 B2 | 9/2015 | Yang et al. |
| 9,197,553 B2 | 11/2015 | Jain et al. |
| 9,324,022 B2 | 4/2016 | Williams, Jr. et al. |
| 9,338,065 B2 | 5/2016 | Vasseur et al. |
| 9,338,084 B2 | 5/2016 | Badoni |
| 9,374,294 B1 | 6/2016 | Pani |
| 9,419,811 B2 | 8/2016 | Dong et al. |
| 9,544,224 B2 | 1/2017 | Chu et al. |
| 9,553,799 B2 | 1/2017 | Tarricone et al. |
| 9,558,451 B2 | 1/2017 | Nilsson et al. |
| 9,596,099 B2 | 3/2017 | Yang et al. |
| 9,614,756 B2 | 4/2017 | Joshi |
| 9,654,385 B2 | 5/2017 | Chu et al. |
| 2002/0061001 A1 | 5/2002 | Garcia-Luna-Aceves et al. |
| 2002/0101505 A1 | 8/2002 | Gutta et al. |
| 2002/0105904 A1 | 8/2002 | Hauser et al. |
| 2002/0116154 A1 | 8/2002 | Nowak et al. |
| 2002/0159386 A1 | 10/2002 | Grosdidier et al. |
| 2003/0005149 A1 | 1/2003 | Haas et al. |
| 2003/0061340 A1 | 3/2003 | Sun et al. |
| 2003/0067912 A1 | 4/2003 | Mead et al. |
| 2003/0091052 A1 | 5/2003 | Pate et al. |
| 2003/0117992 A1 | 6/2003 | Kim et al. |
| 2003/0133417 A1 | 7/2003 | Badt, Jr. |
| 2003/0187800 A1 | 10/2003 | Moore et al. |
| 2003/0225549 A1 | 12/2003 | Shay et al. |
| 2004/0153563 A1 | 8/2004 | Shay et al. |
| 2004/0218525 A1 | 11/2004 | Elie-Dit-Cosaque et al. |
| 2005/0111487 A1 | 5/2005 | Matta et al. |
| 2005/0114532 A1 | 5/2005 | Chess et al. |
| 2005/0143979 A1 | 6/2005 | Lee et al. |
| 2005/0286711 A1 | 12/2005 | Lee et al. |
| 2006/0072471 A1 | 4/2006 | Shiozawa |
| 2006/0083193 A1 | 4/2006 | Womack et al. |
| 2006/0116146 A1 | 6/2006 | Herrod et al. |
| 2006/0133404 A1 | 6/2006 | Zuniga et al. |
| 2006/0274647 A1 | 12/2006 | Wang et al. |
| 2007/0047707 A1 | 3/2007 | Mayer et al. |
| 2007/0071030 A1 | 3/2007 | Lee |
| 2007/0083650 A1 | 4/2007 | Collomb et al. |
| 2007/0120966 A1 | 5/2007 | Murai |
| 2007/0149249 A1 | 6/2007 | Chen et al. |
| 2007/0192065 A1 | 8/2007 | Riggs et al. |
| 2007/0208590 A1 | 9/2007 | Dorricott et al. |
| 2008/0049622 A1 | 2/2008 | Previdi et al. |
| 2008/0089246 A1 | 4/2008 | Ghanwani et al. |
| 2008/0140817 A1 | 6/2008 | Agarwal et al. |
| 2008/0159151 A1 | 7/2008 | Datz et al. |
| 2008/0181259 A1 | 7/2008 | Andreev et al. |
| 2008/0192651 A1 | 8/2008 | Gibbings |
| 2008/0293353 A1 | 11/2008 | Mody et al. |
| 2009/0003232 A1 | 1/2009 | Vaswani et al. |
| 2009/0010264 A1 | 1/2009 | Zhang |
| 2009/0073988 A1 | 3/2009 | Ghodrat et al. |
| 2009/0129316 A1 | 5/2009 | Ramanathan et al. |
| 2009/0147714 A1 | 6/2009 | Jain et al. |
| 2009/0147737 A1 | 6/2009 | Tacconi et al. |
| 2009/0168653 A1 | 7/2009 | St. Pierre et al. |
| 2009/0271467 A1 | 10/2009 | Boers et al. |
| 2009/0303908 A1 | 12/2009 | Deb et al. |
| 2010/0046504 A1 | 2/2010 | Hill |
| 2010/0165863 A1 | 7/2010 | Nakata |
| 2011/0082596 A1 | 4/2011 | Meagher et al. |
| 2011/0116389 A1 | 5/2011 | Tao et al. |
| 2011/0149759 A1 | 6/2011 | Jollota |
| 2011/0228696 A1 | 9/2011 | Agarwal et al. |
| 2011/0255570 A1 | 10/2011 | Fujiwara |
| 2011/0267962 A1 | 11/2011 | J S A et al. |
| 2011/0274283 A1 | 11/2011 | Athanas |
| 2012/0009890 A1 | 1/2012 | Curcio et al. |
| 2012/0075999 A1 | 3/2012 | Ko et al. |
| 2012/0163177 A1 | 6/2012 | Vaswani et al. |
| 2012/0192075 A1 | 7/2012 | Ebtekar et al. |
| 2012/0213062 A1 | 8/2012 | Liang et al. |
| 2012/0213124 A1 | 8/2012 | Vasseur et al. |
| 2012/0307629 A1 | 12/2012 | Vasseur et al. |
| 2012/0321058 A1 | 12/2012 | Eng et al. |
| 2013/0003542 A1 | 1/2013 | Catovic et al. |
| 2013/0010610 A1 | 1/2013 | Karthikeyan et al. |
| 2013/0028073 A1 | 1/2013 | Tatipamula et al. |
| 2013/0070755 A1 | 3/2013 | Trabelsi et al. |
| 2013/0094647 A1 | 4/2013 | Mauro et al. |
| 2013/0128720 A1 | 5/2013 | Kim et al. |
| 2013/0177305 A1 | 7/2013 | Prakash et al. |
| 2013/0250754 A1 | 9/2013 | Vasseur et al. |
| 2013/0275589 A1 | 10/2013 | Karthikeyan et al. |
| 2013/0311673 A1 | 11/2013 | Karthikeyan et al. |
| 2014/0049595 A1 | 2/2014 | Feng et al. |
| 2014/0126423 A1 | 5/2014 | Vasseur et al. |
| 2014/0133327 A1 | 5/2014 | Miyauchi |
| 2014/0204759 A1 | 7/2014 | Guo et al. |
| 2014/0207945 A1 | 7/2014 | Galloway et al. |
| 2014/0215077 A1 | 7/2014 | Soudan et al. |
| 2014/0219103 A1 | 8/2014 | Vasseur et al. |
| 2014/0293955 A1 | 10/2014 | Keerthi |
| 2014/0337840 A1 | 11/2014 | Hyde et al. |
| 2015/0023174 A1 | 1/2015 | Dasgupta et al. |
| 2015/0052095 A1 | 2/2015 | Yang et al. |
| 2015/0142702 A1 | 5/2015 | Nilsson et al. |
| 2015/0215365 A1 | 7/2015 | Shaffer et al. |
| 2015/0242760 A1* | 8/2015 | Miao ................... G06N 20/00 706/12 |
| 2015/0324689 A1 | 11/2015 | Wierzynski et al. |
| 2015/0358248 A1 | 12/2015 | Saha et al. |
| 2016/0037304 A1 | 2/2016 | Dunkin et al. |
| 2016/0105345 A1 | 4/2016 | Kim et al. |
| 2016/0203404 A1 | 7/2016 | Cherkasova et al. |
| 2016/0315802 A1 | 10/2016 | Wei et al. |
| 2016/0335111 A1 | 11/2016 | Bruun et al. |
| 2017/0109322 A1 | 4/2017 | McMahan et al. |
| 2017/0150399 A1 | 5/2017 | Kedalagudde et al. |
| 2017/0228251 A1 | 8/2017 | Yang et al. |
| 2017/0289033 A1 | 10/2017 | Singh et al. |
| 2017/0347308 A1 | 11/2017 | Chou et al. |
| 2017/0353361 A1 | 12/2017 | Chopra et al. |
| 2018/0013656 A1 | 1/2018 | Chen |

OTHER PUBLICATIONS

Nadkarni et al., "Preventing Accidental Data Disclosure in Modern Operating Systems", Nov. 8, 2013, Ccs'13, pp. 1029-1041 (Year: 2013).*

(56) References Cited

OTHER PUBLICATIONS

International Search Report and Written Opinion from the International Searching Authority, dated Jul. 20, 2018, 10 pages, for the corresponding International Application No. PCT/US2018/028057.
Akkaya, Kemal, et al., "A survey on routing protocols for wireless sensor networks" Abtract, 1 page, Ad Hoc Networks, May 2005.
Alsheikh, Mohammad Abu, et al., "Machine Learning in Wireless Sensor Networks: Algorithms, Strategies, and Applications," Mar. 19, 2015, 23 pages.
Author Unknown, "White Paper on Service Enabler Virtualization," Draft dated Nov. 9, 2015, 26 pages, Open Mobile Alliance (OMA), San Diego, CA, USA.
Baccour, Nouha, et al., "Radio Link Quality Estimation in Wireless Sensor Networks: A Survey," 2011, 35 pages.
Fan, NA, "Learning Nonlinear Distance Functions Using Neural Network for Regression with Application to Robust Human Age Estimation," Abstract, 1 page, IEEE International Conference on Computer Vision (ICCV), Nov. 2011, Institute of Electrical and Electronics Engineers, Barcelona, Spain.
Flushing, Eduardo Feo, et al.: "A mobility-assisted protocol for supervised learning of link quality estimates in wireless networks," Feb. 2012, 8 pages.
Fortunato, Santo, "Community Detection in Graphs", arXiv:0906.0612v2 [physics.soc-ph]; Physics Reports 486, 75-174, Jan. 25, 2010, 103 pages.
Godsill, Simon, et al., "Detection and suppression of keyboard transient auxiliary keybed microphone," Abstract, 1 page, 2015 IEEE International Conference on Acoustics, Speech and Signal Processing (ICASSP), Apr. 19-24, 2015, Brisbane, QLD, Australia (Abstract available at http://ieeexplore.ieee.org/document/7177995/, downloaded on Feb. 28, 2018.
Hershey, Shawn, et al., "CNN Architectures for Large-Scale Audio Classification," Jan. 10, 2017, 5 pages, Google, Inc., New York, NY, and Mountain View, CA, USA.
Hradis, Michael, et al., "Voice activity detection from gaze in video mediated communication," ACM, Mar. 28-30, 2012 http://medusa.fit.vutbr.cz/TA2/TA2, 4 pages.
Hui, J., et al., "An IPv6 Routing Header for Source Routes with the Routing Protocol for Low-Power and Lossy Networks (RPL)", Request for Comments 6554, Mar. 2012, 12 pages, Internet Engineering Task Force Trust.
Kuklinski, Slawomir, et al., "Design Principles of Generalized Network Orchestrators," 2016 IEEE International Conference on Communications Workshops (ICC), May 23, 2016, pp. 430-435.
Liu, Tao, et al., "Data-driven Link Quality Prediction Using Link Features," ACM Transactions on Sensor Networks, Feb. 2014, 35 pages.
McKenna, Shannon, et al., "Acoustic Event Detection Using Machine Learning: Identifying Train Events," Sep. 2017, pp. 1-5, http://cs229.stanford.edu/proj2012/McKennaMcLaren-AcousticEventDetectionUsingMachineLearningIdentifyingTrainEvents.pdf, downloaded on Feb. 28, 2018.

Newman, M. E. J., "Analysis of weighted networks," Phys. Rev. E 70, 056131, Jul. 20, 2004, 9 pages, http://arxiv.org/pdf/condmat/0407503.pdf.
Newman, W. E. J., "Modularity and Community Structure in Networks", Proceedings of the National Academy of Sciences of the United States of America, Jun. 2006, vol. 103, No. 23, pp. 8577-8582, PNAS, Washington, DC.
Piczak, Karol J., "Environmental Sound Classification With Convolutional Neutral Networks," 2015 IEEE International Workshop on Machine Learning for Signal Processing, Sep. 17-20, 2015, Boston, USA.
Raghavendra, Kulkami V., et al., "Computational Intelligence in Wireless Sensor Networks: A Survey," Abstract, 1 page, IEEE Communications Surveys & Tutorials, May 27, 2010.
Salamon, Justin, et al., "Deep Convolutional Neutral Networks and Data Augmentation for Environmental Sound Classification," IEEE Signal Processing Letters, Accepted Nov. 2016, 5 pages.
Siddiky, Feroz Ahmed, et al., "An Efficient Approach to Rotation Invariant Face Detection Using PCA, Generalized Regression Neural Network and Mahalanobis Distance by Reducing Search Space," Abstract, 1 page, 10th International Conference on Computer and Information Technology, Dec. 2007, Dhaka, Bangladesh.
Singh, Shio Kumar, et al., "Routing Protocols in Wireless Sensor Networks—A Survey," International Journal of Computer Science & Engineering Survey (IJCSES) vol. 1, No. 2, Nov. 2010, pp. 63-83.
Tang, Pengcheng, et al., "Efficient Auto-scaling Approach in the Telco Cloud using Self-learning Algorithm," 2015 IEEE Global Communications Conference (Globecom), Dec. 6, 2015, pp. 1-6.
Tang, Yongning, et al., "Automatic belief network modeling via policy interference for SDN fault localization," Journal of Internet Services and Applications, Jan. 20, 2016, pp. 1-13, Biomed Central Ltd., London, UK.
Ting, Jo-Anne, et al., "Variational Bayesian Least Squares: An Application to Brain-Machine Interface Data," Neural Networks, vol. 21, Issue 8, Oct. 2008, pp. 1112-1131, Elsevier.
Tsang, Yolanda, et al., "Network Radar: Tomography from Round Trip Time Measurements," ICM'04, Oct. 25-27, 2004, Sicily, Italy.
Vasseur, JP., et al., "Routing Metrics Used for Path Calculation in Low-Power and Lossy Networks," Request for Comments 6551, Mar. 2012, 30 pages, Internet Engineering Task Force Trust.
Winter, T., et al., "RPL: IPv6 Routing Protocol for Low-Power and Lossy Networks," Request for Comments 6550, Mar. 2012, 157 pages, Internet Engineering Task Force Trust.
Zhang, Xiaoju, et al., "Dilated convolution neutral network with LeakyReLU for environmental sound classification," Abstract, 1 page, 2017 $22^{nd}$ International Conference on Digital Signal Processing (DSP), Aug. 23-25, 2017, London, U.K.
Zinkevich, Martin, et al. "Parallelized Stochastic Gradient Descent," 2010, 37 pages.
"VXLAN Network with MP-BGP EVPN Control Plane Design Guide," © Cisco Systems, Inc., Mar. 21, 2016, 44 pages.

* cited by examiner

HISTORICAL DATA

| USER ID | ORG ID | SIGN UP DATE | ACQUISITION CHANNEL | PLAN | TEAM COUNT | SPACE COUNT | MESSAGE COUNT | MENTION COUNT | ... | CHURN |
|---|---|---|---|---|---|---|---|---|---|---|
| jon@compA.com | COMPANY A | 2016-2-3 | PARTNER | M2 | 5 | 4 | 31 | 3 | | YES |
| tom@gmail.com | INDIVIDUAL | 2016-11-23 | WEB | M1 | 10 | 6 | 67 | 15 | | NO |
| dave@compB.com | COMPANY B | 2016-5-3 | WEB | M3 | 20 | 4 | 87 | 21 | | NO |
| ... | | | | | | | | | | |

DATA POINTS (X) / LABELS (Y)

NEW DATA

| USER ID | ORG ID | SIGN UP DATE | ACQUISITION CHANNEL | PLAN | TEAM COUNT | SPACE COUNT | MESSAGE COUNT | MENTION COUNT | ... |
|---|---|---|---|---|---|---|---|---|---|
| alan@yahoo.com | INDIVIDUAL | 2017-1-13 | PARTNER | M1 | 34 | 45 | 145 | 43 | |
| bob@gmail.com | INDIVIDUAL | 2016-6-23 | PARTNER | M2 | 12 | 5 | 46 | 64 | |
| jane@compA.com | COMPANY A | 2016-3-3 | WEB | M3 | 7 | 13 | 79 | 14 | |
| ... | | | | | | | | | |

DATA SOVEREIGNTY COMPLIANT MACHINE LEARNING

1. Technical Field

The subject technology relates to systems and methods for implementing incremental machine learning techniques across multiple geographic domains, and particularly for maintaining data sovereignty compliance for sovereign regions in which training data cannot be exported.

2. Introduction

Data sovereignty is the concept that information stored in a digital form is subject to the laws of the country in which it is located. Many of the current concerns that surround data sovereignty relate to enforcing privacy regulations and preventing data that is stored in a foreign country from being subpoenaed by the host country's government.

The wide-spread adoption of cloud computing services as well as new approaches to data storage, including object storage, have broken down traditional geopolitical barriers. In response, many countries have regulated new compliance requirements by amending their current laws or enacting legislation that requires customer data to be kept within the country in which the customer resides.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology; however, it will be clear and apparent that the subject technology is not limited to the specific details set forth herein and may be practiced without these details. In some instances, structures and components are shown in block diagram form in order to avoid obscuring certain concepts.

Overview:

Aspects of the subject disclosure describe solutions for implementing incremental machine learning techniques between sovereign regions for which data export is restricted. As discussed in further detail below, data sovereignty restrictions can restrict the export of certain types of data, such as different types of user data or personal information, that are useful for initializing and training various machine learning models. Using incremental machine learning methods, a given machine learning model can be trained and updated using only data from users residing in the same (sovereign) region. Once trained, the machine learning model can be exported for use in a different sovereign region, without the need to violate export controls by transferring any actual training data. Consequently, the machine learning model can be used in additional sovereign regions, and subsequently updated/trained with data that may also be export restricted, without violating export controls for user data of any sovereign region.

In some aspects, systems of the subject technology are configured to perform operations including receiving a machine learning model ("ML model") via a first coordination agent, the ML model based on a first training data set corresponding with a first sovereign region, sending the ML model to a second coordination agent in a second sovereign region, wherein the second sovereign region is different from the first sovereign region, and receiving a second ML model from the second coordination agent, wherein the second ML model is based on updates to the original ML model using a second training data set corresponding with the second sovereign region.

Description:

Various machine learning techniques involve the configuration or "training" of a machine learning (ML) model, for example, using "training data" for which the desired outputs, labels, and/or target classification categories are known. Generally, ML models can be improved through exposure to greater amounts of training data. For example, some ML algorithms use historical data points (X) and labels (Y) to train a model Y=F(X) that can be used to predict labels (Y). The predictive power of the model Y=F(X) is generally improved as the model is presented with greater amounts of training data, e.g., shown a greater number of examples of the relationship between historical data points (X), and labels (Y).

With conventional ML, the only way to update the model Y=F(X) is to perform batch training using all historical data, e.g., all historical data (X) and corresponding labels (Y). Conventional ML training has been improved with incremental ML techniques, which eliminate the need for batch training by allowing models to be updated incrementally, e.g., as soon as new training data become available. However, incremental ML techniques do not address data availability barriers imposed by data sovereignty regulations, which limit the total amount of data available for ML model training. For example, data sovereignty regulations prohibit the export of certain types of data (e.g., user data and personal information) and can therefore impose significant restrictions on ML algorithms deployed in cloud environments and in which implementation is stretched over multiple different sovereign regions.

Aspects of the disclosed technology address the foregoing limitations imposed by data sovereignty regulations by employing incremental ML techniques in which ML models are exported between various sovereign regions, without violating data export controls. As discussed in further detail below, the coordination of ML model distribution, and continued ML model updates/training can be facilitated through the use of a centralized system i.e. a "coordination server." Alternatively, ML model distribution can be coordinated using a distributed (e.g., peer-to-peer) communication scheme.

It is understood that the described techniques can be applied to a variety of machine learning and/or classification algorithms, and that the scope of the technology is not limited to a specific machine learning implementation. By way of example, implementations of the technology can include the coordination and distribution of incremental ML models based on one or more classification algorithms, including but not limited to: a Multinomial Naive Bayes classifier, a Bernoulli Naive Bayes classifier, a Perceptron classifier, a Stochastic Gradient Descent (SGD) Classifier, and/or a Passive Aggressive Classifier, or the like.

In some aspects, ML models can be configured to perform various types of regression, for example, using one or more regression algorithms, including but not limited to: a Stochastic Gradient Descent Regressor, and/or a Passive Aggressive Regressor, etc. ML models can also be based on clustering algorithms (e.g., a Mini-batch K-means clustering algorithm), a recommendation algorithm (e.g., a Miniwise Hashing algorithm, or Euclidean LSH algorithm), and/or an anomaly detection algorithm, such as a Local outlier factor. Additionally, ML models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-Means algorithm, etc.

Figure 1A:
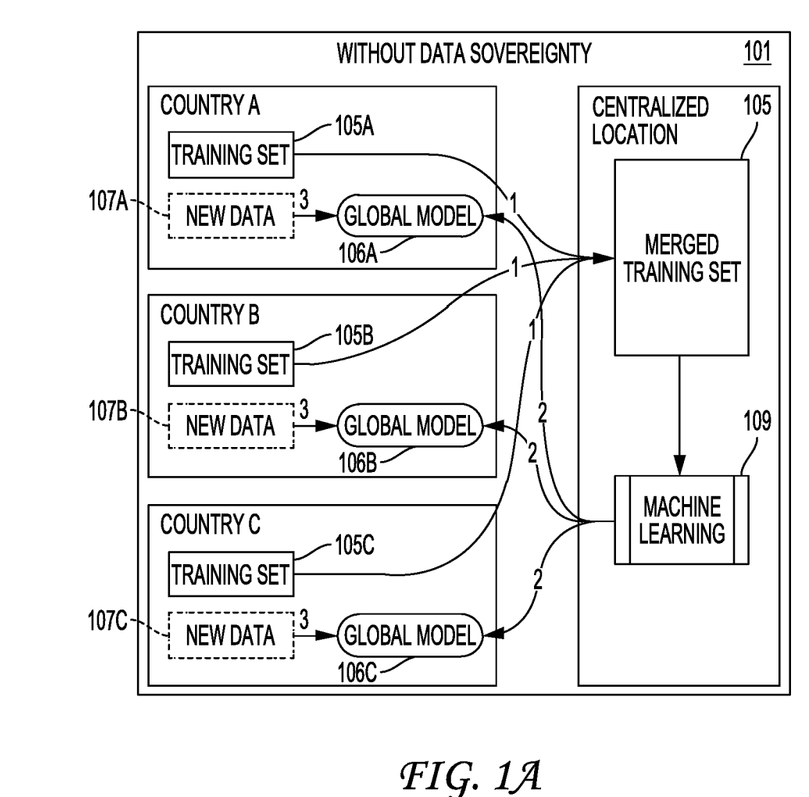
FIG. 1A conceptually illustrates an example network topology without data sovereignty.

FIG. 1A conceptually illustrates an example topology 101 that is not subject to data sovereignty restrictions. The "Centralized Location" can be in a different sovereign region than each of "Country A", "Country B", and "Country C." In this example, data existing in each of region is freely shared for the purpose of implementing an ML method. For example, Centralized Location contains merged training set 105 that represents combined training data from each of the various sovereign regions. That is, merged training set 105 represents training set 105A received from Country A, training set 105B received from Country B, and training set 105C received from Country C.

In this example, merged training set 105 is used to produce machine learning model 109 that is used to serve each sovereign region, e.g., each of Country A, Country B, and Country C, in the form of global models 106A, 106B, and 106C, respectively. As discussed above, incremental machine learning techniques can be implemented at each of the separate sovereign regions, and used to update the respectively provided global model with new data associated with that region. For example, using incremental machine learning updates, global model 106A can be updated with new data 107A, associated with Country A. In turn, global model 106B is updated with new data 107B resident in Country B, and global model 106C is updated with new data 107C, residing in Country C.

The sharing of training data represented by topology 101 is advantageous in many ML implementations due to the greater availability of training data. However, in practice, restrictions on data export (data sovereignty regulations) often prohibit the sharing of training data sets outside of their respective sovereign regions.

Figure 1B:
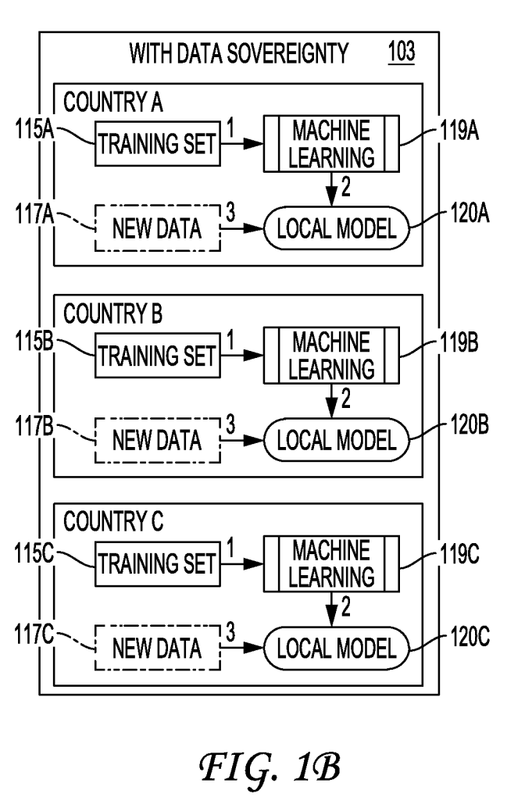
FIG. 1B conceptually illustrate an example network topology with data sovereignty.

FIG. 1B conceptually illustrates an example topology 103 in which data sovereignty limitations are imposed. In this example, each sovereign region contains an isolated machine learning algorithm used to produce a local model that can only be updated using data from the respective region. The scenario exemplified by topology 103 is a common occurrence for jurisdictions in which data for user residents must be stored within the jurisdiction and data export is restricted.

As illustrated with respect to Country A, machine learning algorithm 119A is trained using training set 115A to produce local model 120A. In turn, local model 120A is updated based on new data 117A, all of which reside in, and are not exported from Country A. Country B, and Country C are subject to similar restrictions. As such, the ML algorithm used in Country B (machine learning 119B) can only be initialized using training set 115B, and local model 120B updated using new data 117B. The ML algorithm used in Country C (e.g., machine learning 119C) can only be initialized using training set 115C; similarly, local model 120C is only updated using new data 117C. That is, none of the ML algorithms, or subsequent models, can take advantage of data sets and/or new data provided by outside sovereign regions.

Figure 2:
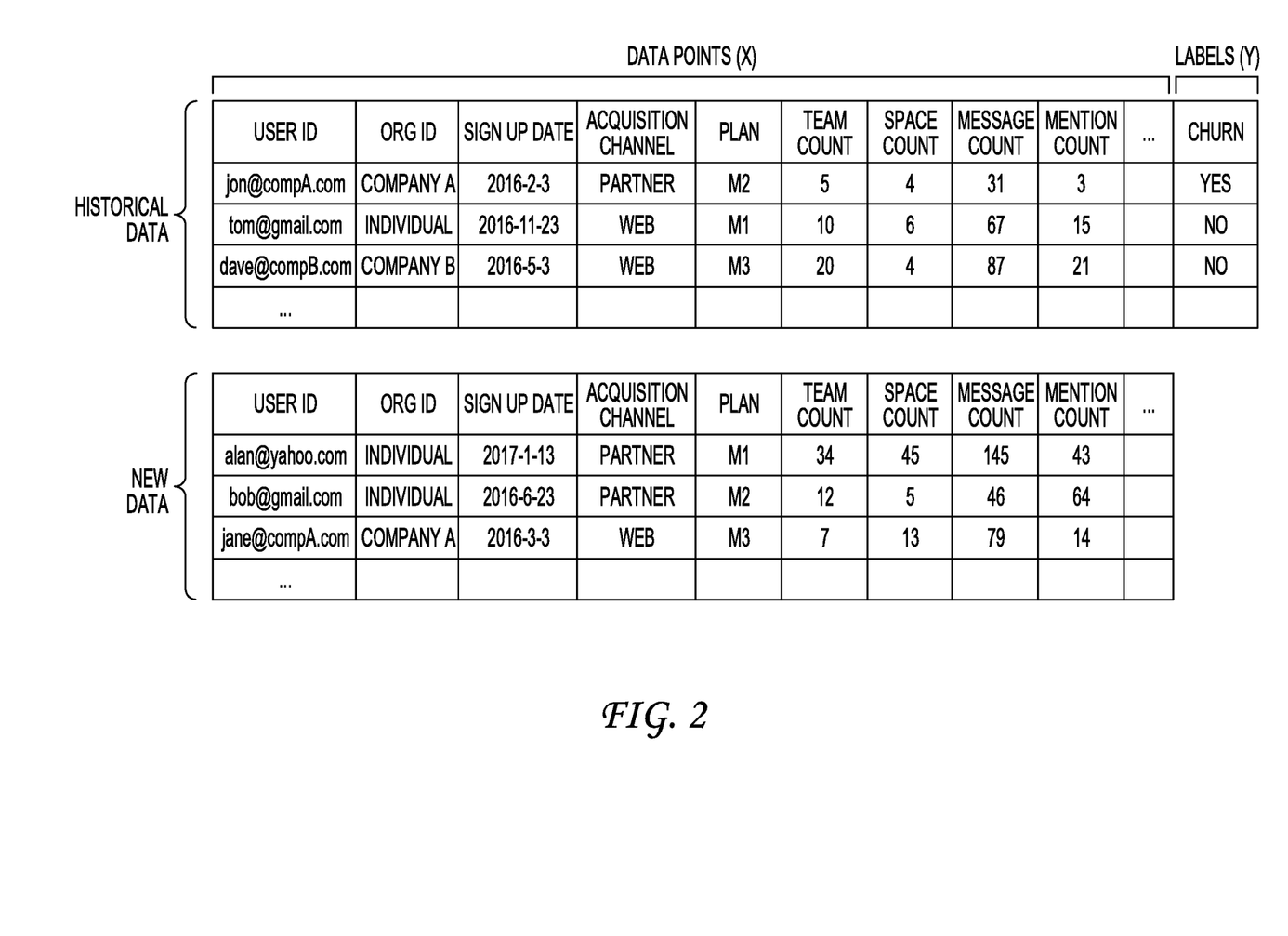
FIG. 2 illustrates an example data set that could be utilized for the training of a machine learning model.

FIG. 2 illustrates an example data set that can represent data provided to a distributed machine learning implementation of the subject technology. In the example of FIG. 2, various attributes, i.e., "Data points (x)", for historical data are correlated with an output target label, i.e., "Labels (Y)." In an incremental ML approach, the "historical data" and known labels can be utilized as training data to initialize the ML model. The "new data" then processed by the ML model, is used to further update the ML model. In this manner, continuous training can be performed without the need to retrain the ML model on the entirety of the training data batch, i.e., without the need to retrain the ML model on the historical data.

The data provided in FIG. 2 can exemplify the type of data that can be subject to export restrictions, e.g., user data and/or personal information. In this example, identifying user information (User IDs), and other customer information are correlated with indicators of customer churn, i.e., Labels (Y).

Figure 3:
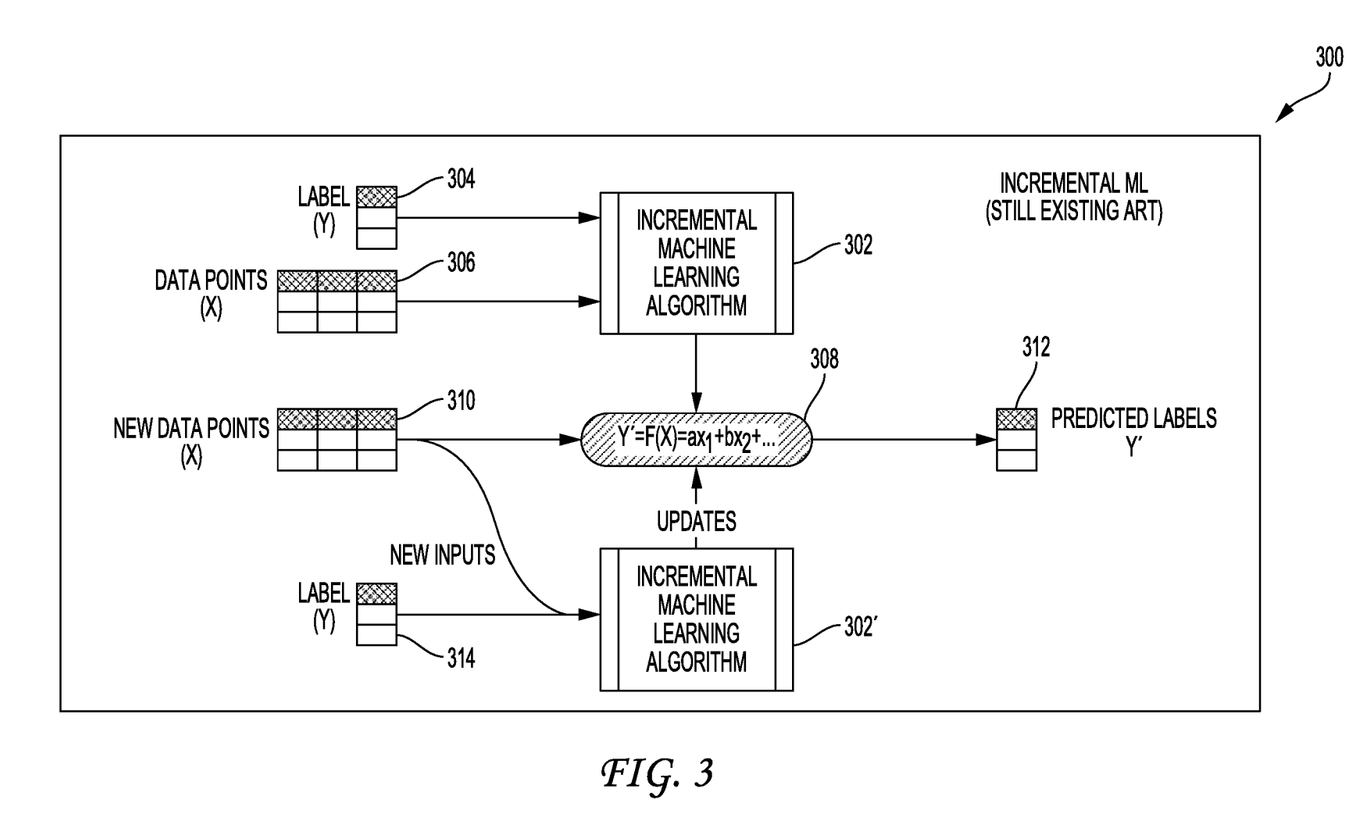
FIG. 3 conceptually illustrates an example of an incremental machine learning technique.

FIG. 3 conceptually illustrates an example topology 300 of an incremental machine learning technique. Topology 300 includes incremental machine learning algorithm 302 that is generated through training performed on a data set consisting of labels 304, and data points 306. Once incremental machine learning algorithm 302 has completed training on the training data set, machine learning model 308 is produced. In this example, model 308 is a function that provides a mapping between input data points (X), and labels (Y), similar to the example data provided above with respect to FIG. 2. It is understood that other types of data mappings can be performed by an ML function, such as learning model 308, without departing from the technology.

Subsequently, new data points 310 can be provided to machine learning model 308, which performs label predictions outputted as "predicted labels" 312. In the incremental ML model illustrated by topology 300, incremental machine learning algorithm 302 can be continuously or periodically updated without the need to perform retraining on labels 304 and/or data points 306. For example, new data points 310, when accompanied by new inputs 314, can be used to update incremental machine learning algorithm 302, (depicted as 302' in FIG. 2 for the convenience of layout). In such incremental ML implementations, it should be noted that machine learning model 308 (resulting from training performed on incremental machine algorithm 302), can be used for processing entirely new data sets, and can also be updated using new data separate and distinct from the original training data (e.g., labels 304, and data points 306). Incremental machine learning algorithms are commonly used when predictive models need to be updated frequently in real-time, and/or when training set is so big that it needs to be broken into smaller chunks and fed to ML algorithms in iterations.

Figure 4:
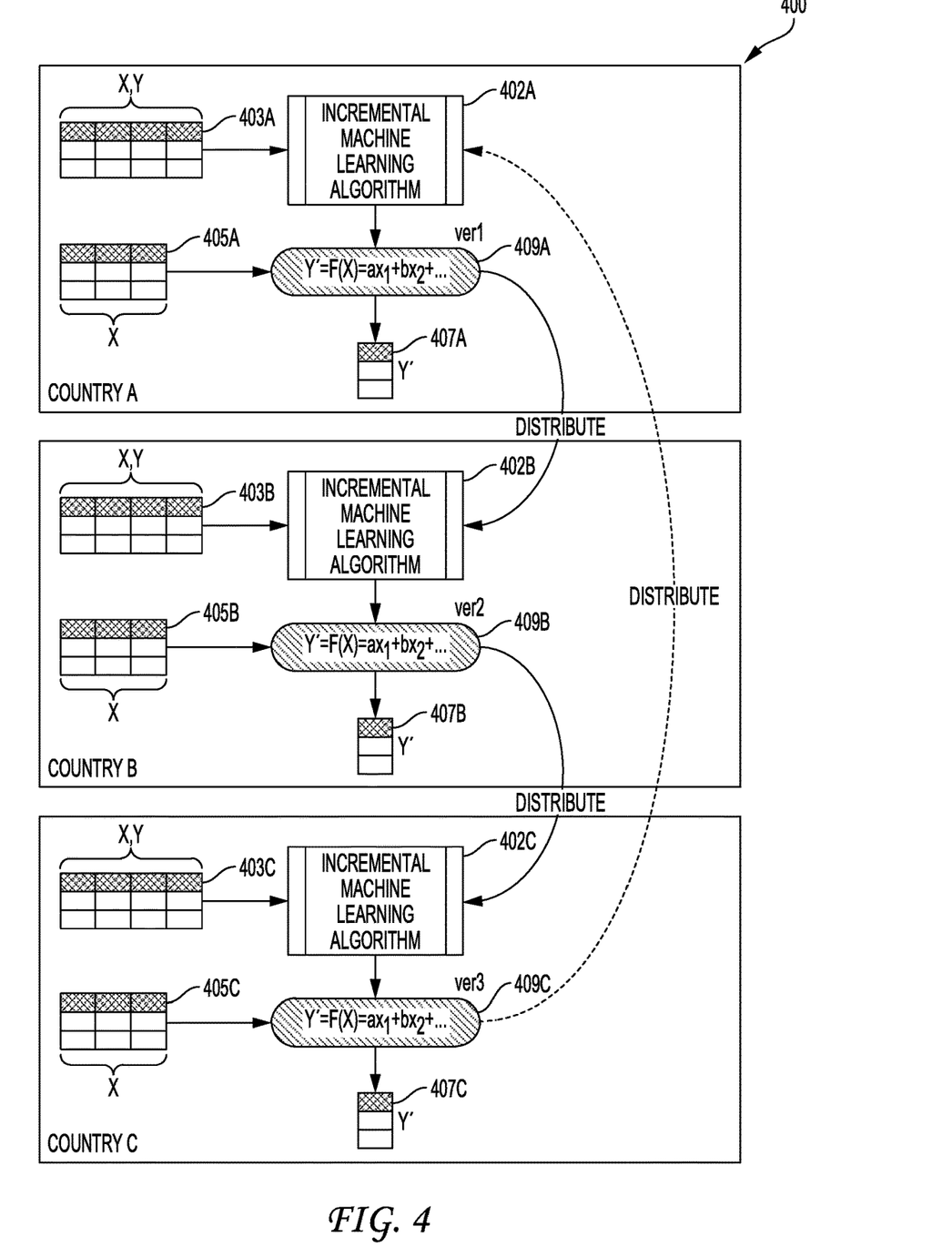
FIG. 4 conceptually illustrates a distributed incremental machine learning technique that is deployed across multiple distinct geographic sovereignties, according to some aspects of the subject technology.

FIG. 4 conceptually illustrates an example network topology 400 for implementing a distributed incremental machine learning technique that is deployed across distinct sovereignties, according to some aspects of the technology. As would be appreciated by those of skill in the art, the distributed incremental ML approach illustrated by topology 400 avoids the need to export training data and new data sets as between different sovereign regions (e.g., between Country A, Country B, and/or Country C). As we discussed in further detail below, ML models produced from training on data in each sovereign region are exported for benefit of other regions, without requiring the actual export of data subject to export control.

As illustrated, network topology 400 includes three distinct sovereign regions in which ML deployments are implemented, i.e., Country A, Country B, and Country C. In this example, data sovereignty regulations exist for each country, restricting export of any potential data (e.g., user information or other privacy protected data) that may be included in training data sets, e.g., 403A, 403B and/or 403C, and new data sets e.g., 405A, 405B, and 405C.

Training can be performed on an incremental machine learning algorithm, for example, to produce an ML model that can then be exported to other regions or jurisdictions, without the need to export training data. The trained ML model provides a mathematical relationship (e.g., a function) relating inputs to a specified output parameter (e.g., a customer "churn rate"), and does not include restricted information types. Therefore, export of the trained ML model does not trigger sovereignty restrictions.

In practice, incremental machine learning algorithm 402A is initialized/trained using training data set 403A, in Country A. After training is complete, a first version (e.g., ver1) of ML model 409A is produced. As illustrated, ML model 409A is used to perform machine learning on new data 405A to produce classifications/labels 407A, for application in Country A. Due to data sovereignty restrictions, data contained within training data set 403A, new data 405A, and labels 407A are potentially subject to restriction and cannot be exported from their current sovereign region, e.g., Country A.

To gain the benefit of training performed to produce ML model 409A (e.g., using training data 403A and new data 405A), ML model 409A is exported to Country B. Because ML model 409A provides only a mathematical relationship between input data (X) and output labels (Y), the actual information comprising ML model 409A is not subject to export controls.

Once exported to Country B, ML model 409A is subject to further training, e.g., now as incremental machine learning algorithm 402B. Training is performed using training data 405B resident in Country B, and also subject to export control. The results of further training are used to produce a second version (e.g., ver2) of ML model 409B, and using incremental machine learning techniques, ML model 409B is further updated using new data 405B, resident in Country B. Therefore, ML model 409B represents the cumulative training performed on incremental machine learning algorithm 402A, using training data sets 403A and 403B, as well as new data sets 405A, and 405B. By exporting ML model 409A, the benefit of access to greater amounts of training data can accrue to machine learning implementations performed in Country B, without violating sovereign data controls of either Country A or Country B.

Subsequently, ML model 409B is exported to Country C, where further training is performed using training data 403C and incremental machine learning algorithm 402C to produce ML model 409C (ver3). Similar to the above example, ML model 409C represents a third version of original ML model 409A, that now has the benefit of training performed in all sovereign regions, e.g., Country A, Country B, and Country C, without transmitting data sets between them.

Figure 5:
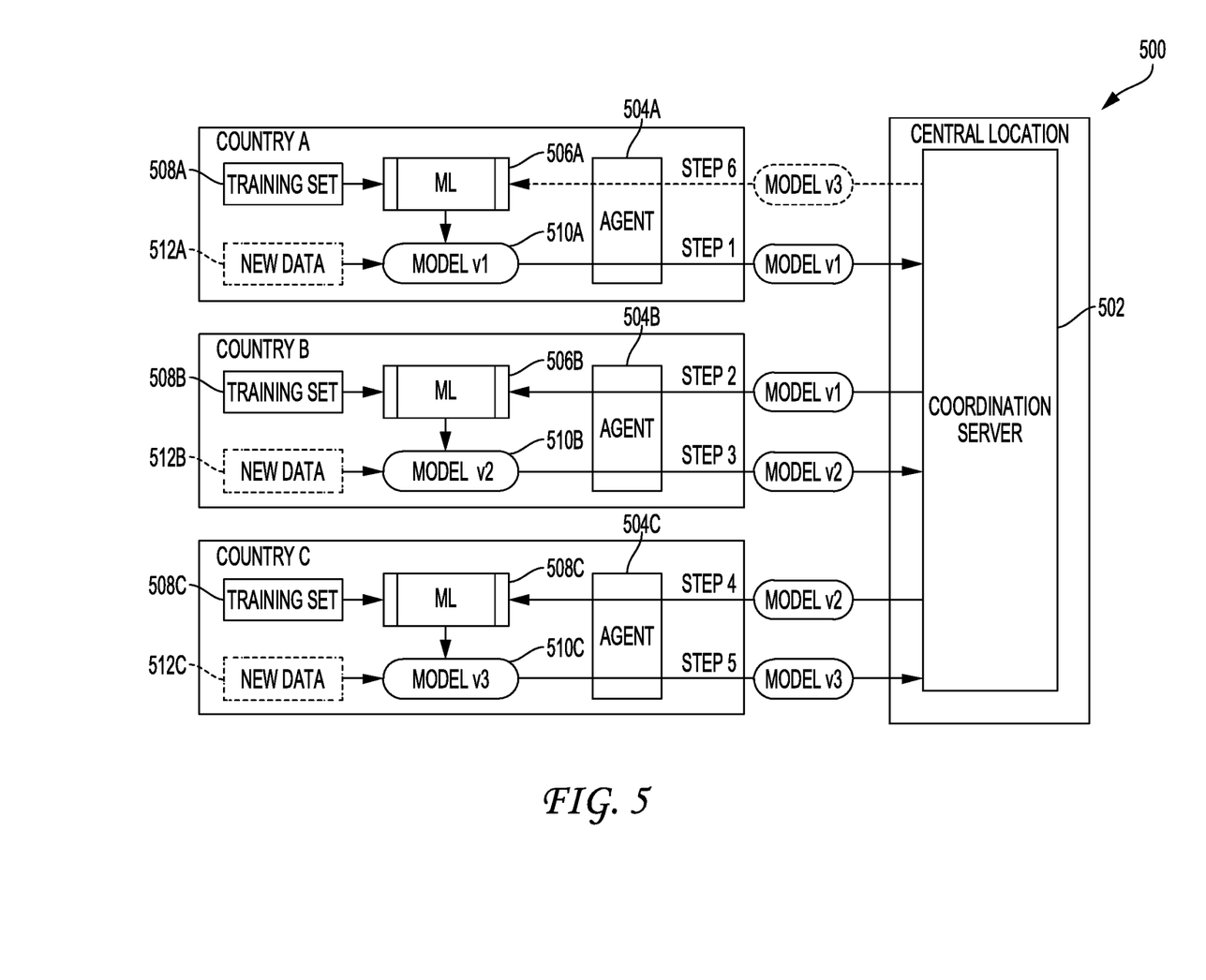
FIG. 5 illustrates an example network topology that can be used to implement a distributed incremental machine learning technique, according to some aspects of the technology.

FIG. 5 conceptually illustrates a network topology 500 that can be used to implement a distributed incremental machine learning technique that adheres to data sovereignty rules, according to some aspects of the technology. Notably, network topology 500 illustrates the use of coordination server 502 configured for recording/managing the distribution of an incremental ML model between various sovereign regions.

As illustrated by example network topology 500, coordination server 502 is communicatively coupled to each of the plurality of agents 504. In this example, agent 504A resides in a first sovereign region (e.g., Country A), agent 504B resides in a second sovereign region (e.g., Country B), and agent 504C resides in a third sovereign region (e.g., Country C). It is understood that the various agents 504 can be one or more servers/systems configured for communicating over a network, such as a local area network (LAN), a wide-area network (WAN), or a network of networks, such as the Internet.

Agents 504 are each configured to facilitate the transfer of ML models 506 to other sovereign areas, via coordination server 502. Although topology 500 illustrates agents 504 and coordination server 502 as being in different geographic/sovereign regions, it is understood that agents 504 can reside outside of the sovereign regions they serve, and/or can share a common region with coordination server 502. However, in some preferred embodiments, agents 504 are proximately located to the ML models 506, and coordination server 502 resides in a central location proximally located to each of the regions, e.g., Country A, Country B, and Country C.

In practice, agent 504A can be configured to provide ML model 510A (v1) to coordination server 502, for example, after ML model 510A is generated through initial training of ML algorithm 506A performed using training set 508A, and incremental training using new data 512A. As in the example discussed with respect to FIG. 4, transfer of ML model 510A to coordination server 502, via agent 504A, does not require the export of training data 508A, or new data 512A from Country A.

After transfer to coordination server 502, ML Model 510A is transferred to Country B via agent 504B, and trained as ML model 506B using training set 508B. The result of additional training using training set 508B produces ML model 510B (v2). In turn, ML model 510B (v2) is provided back to coordination server 502, via agent 504B. Again, the transfer of data necessary to move ML model 510B does not necessitate the transfer of any data in either training set 508B, or new data 512B.

After transfer to coordination server 502, ML model 510B is then transferred to Country C, via agent 504C, and trained as ML model 508C using training data set 508C. The result of additional training using training set 508C produces ML model 510C. As discussed above, model 510C (v3) can be further trained using an incremental machine learning technique, for example, as new data 512C are processed. In some implementations, the latest updated version of the ML model again be provided to the first sovereign region, e.g., for further training using training data and/or new data originating for that region. In the example of topology 500, ML model 510C (v3) can again be provided back to Country A via coordination server 502.

Figure 6:
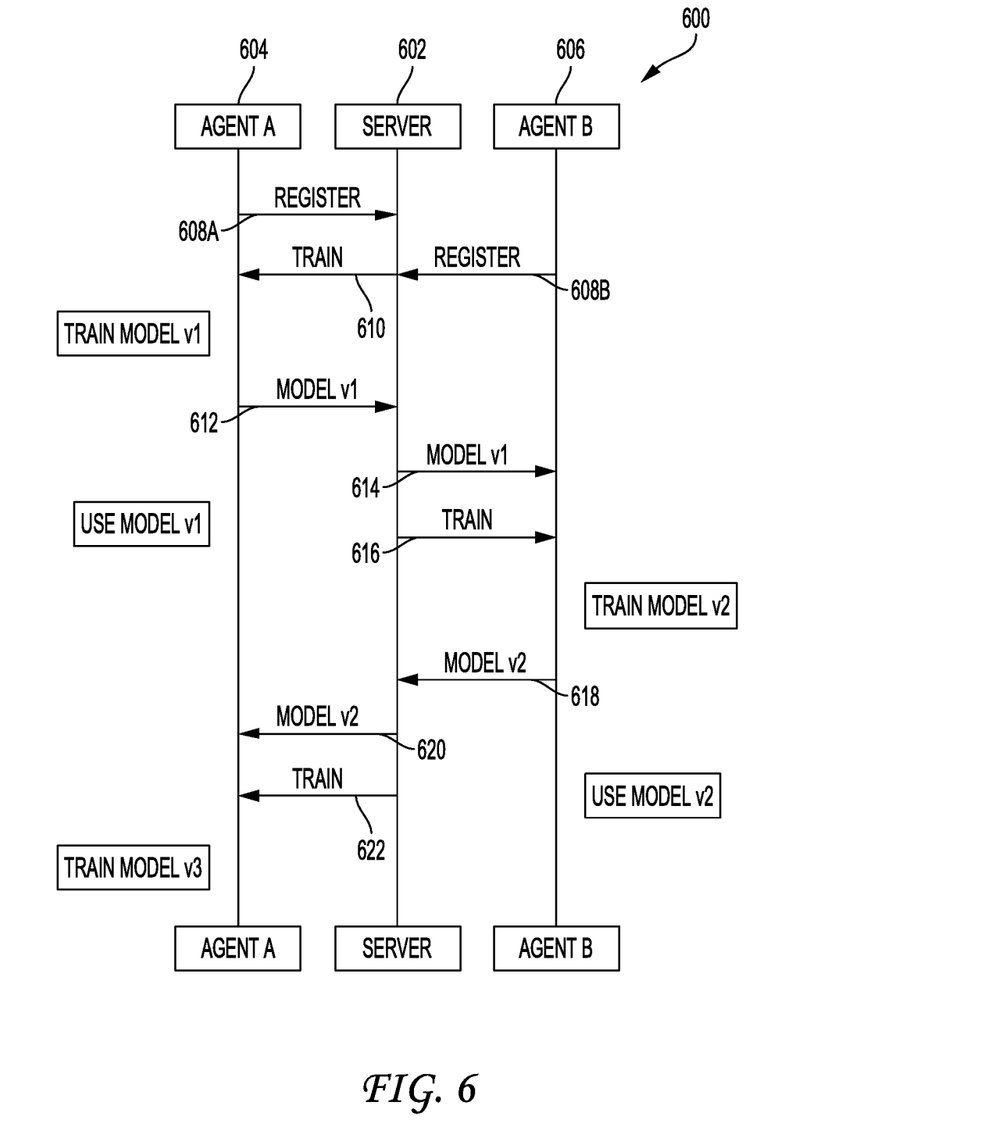
FIG. 6 illustrates a communication timing diagram of example communications exchanged between a coordination server and agents used to implement a distributed incremental machine learning technique, according to some aspects of the technology.

FIG. 6 illustrates an example communication timing diagram 600, illustrating communications timing between a coordination server and various agents, used to implement a distributed incremental machine learning technique. Timing diagram 600 includes server 602 configured for communication with a first agent (e.g., AgentA 604) and a second agent (e.g., AgentB 606). However, it is understood that a greater number of servers can be implemented in communication with a greater (or fewer) number of agents, without departing from the technology. Additionally, in the example timing diagram 600, it is understood that AgentA 604, and AgentB 606 are used to manage the training of ML models in distinct sovereign regions, such as, Country A, and Country B, as discussed above.

In the illustrated example, AgentA 604 and AgentB 606 first register with server 602 (e.g., steps 608A and 608B). After registration, server 602 provides training instruction 610 to AgentA 604, for example, to instruct AgentA 604 to begin training an associated ML model (v1). After ML model (v1) has been trained by AgentA 604, the model is then communicated to server 602 (step 612). Subsequently, ML model (v1) is transferred from server 602 to AgentB 606 (step 614).

Server 602 instructs AgentB 606 to perform further training on ML model (v1) (step 616). Similar to the examples provided above, subsequent training performed on ML model (v1) by AgentB 606 is done using data resident to a sovereign region of AgentB 606. In this manner, the deployment of ML model (v1) into the region of AgentB 606 can benefit from training performed in a sovereign region associated with AgentA 604, without the need to export training data from the region associated with AgentA 604 to AgentB 606.

The result of additional training that is performed by AgentB 606 on ML model (v1), is an updated version of the ML model, e.g., version 2 (i.e., v2), which is then provided by AgentB 606 back to server 602 (step 618). Subsequently, ML model (v2) is transferred from server 602 back to AgentA 604 (step 620). As in the transfer of ML model (v1) from AgentA 604 to AgentB 606, the transfer of ML model (v2) back to AgentA 604 is not necessitate the transfer of any data that may be subject to export controls.

After receiving ML model (v2), AgentA 604 begins additional training upon receipt of a new training command from server 602 (step 622). As illustrated in the foregoing examples, ML model (v3) can then be provided to one or more other sovereign regions without the export of any user data. As such, ML model (v3) can benefit from training performed at multiple various sovereign regions, without violation of sovereign data controls.

Although the timing diagram of FIG. 6, and example topology 500 of FIG. 5 illustrate the coordination of ML model deployment using a centralized server (e.g., a coordination server), other network topologies may be implemented without departing from the scope of the invention. By way of example, the agents (e.g., AgentA 604, and AgentB 606) may be configured for peer-to-peer communication in order to coordinate ML model transfer and deployment between different regions, without use of a centralized system or server.

Figure 7:
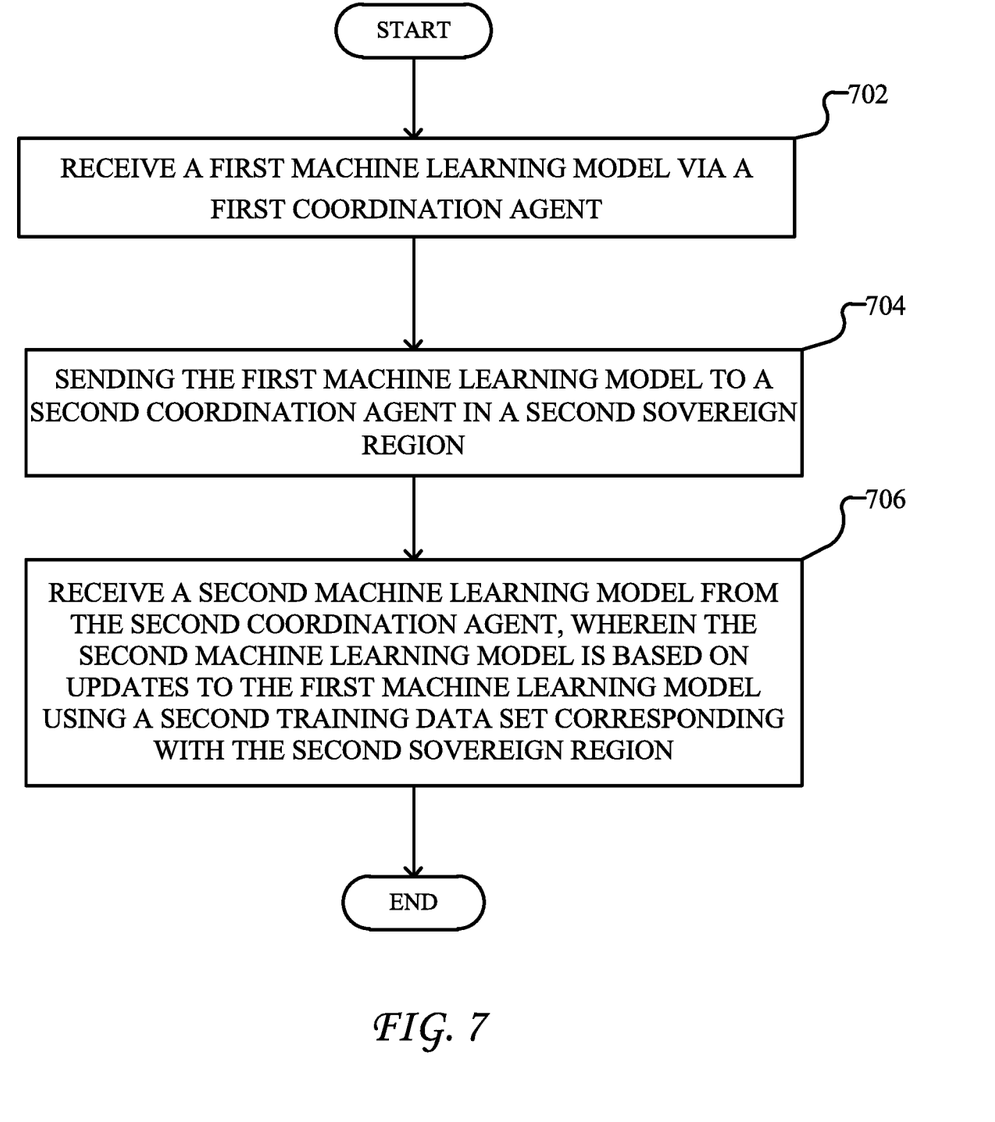
FIG. 7 illustrates an example process for implementing a distributed incremental machine learning technique of the subject technology.

FIG. 7 illustrates an example process 700 for implementing a distributed incremental machine learning technique of the subject technology. Process 700 begins with step 702 in which a first machine learning model is received via a first coordination agent. As discussed above, the first machine learning model can be received by a server (or other network device) that is configured to coordinate distribution of a machine learning model at various phases of training, between different sovereign region. In some aspects, the first machine learning model is based on a first training data set corresponding with a first sovereign region, e.g., from which the model was received.

Because the first machine learning model only contains representing relationships between data set that may or may not be subject to export control, the information comprising the actual learning model does not include information/data that is subject to export controls. By way of example, the first machine learning model can be based on user data associated with a churn rate for particular service (see FIG. 2). However the data describing the first machine learning model does not contain user data, but rather, contains information describing relationships between user data.

In step 704, the first machine learning model is sent to a second coordination agent in a second sovereign region. In some aspects, the second sovereign region is different from the first sovereign region. By way of example, the first sovereign region can represent a particular country (e.g., Country A) that is subject to data sovereignty rules consistent with Country A's legal jurisdiction. In contrast, the second sovereign region can represent a different country (e.g., Country B), that is subject to data sovereignty rules consistent with Country B's legal jurisdiction.

In step, 706, a second machine learning model is received (e.g., by the coordination server) from the second coordination agent. The second machine learning model is based on updates to the first machine learning model using a second training data set corresponding with the second sovereign region.

In some aspects, the second machine learning model can be transferred to a third coordination agent located in a third sovereign region, for example, wherein the third sovereign region is different from each of the first sovereign region and the second sovereign region.

Figure 8:
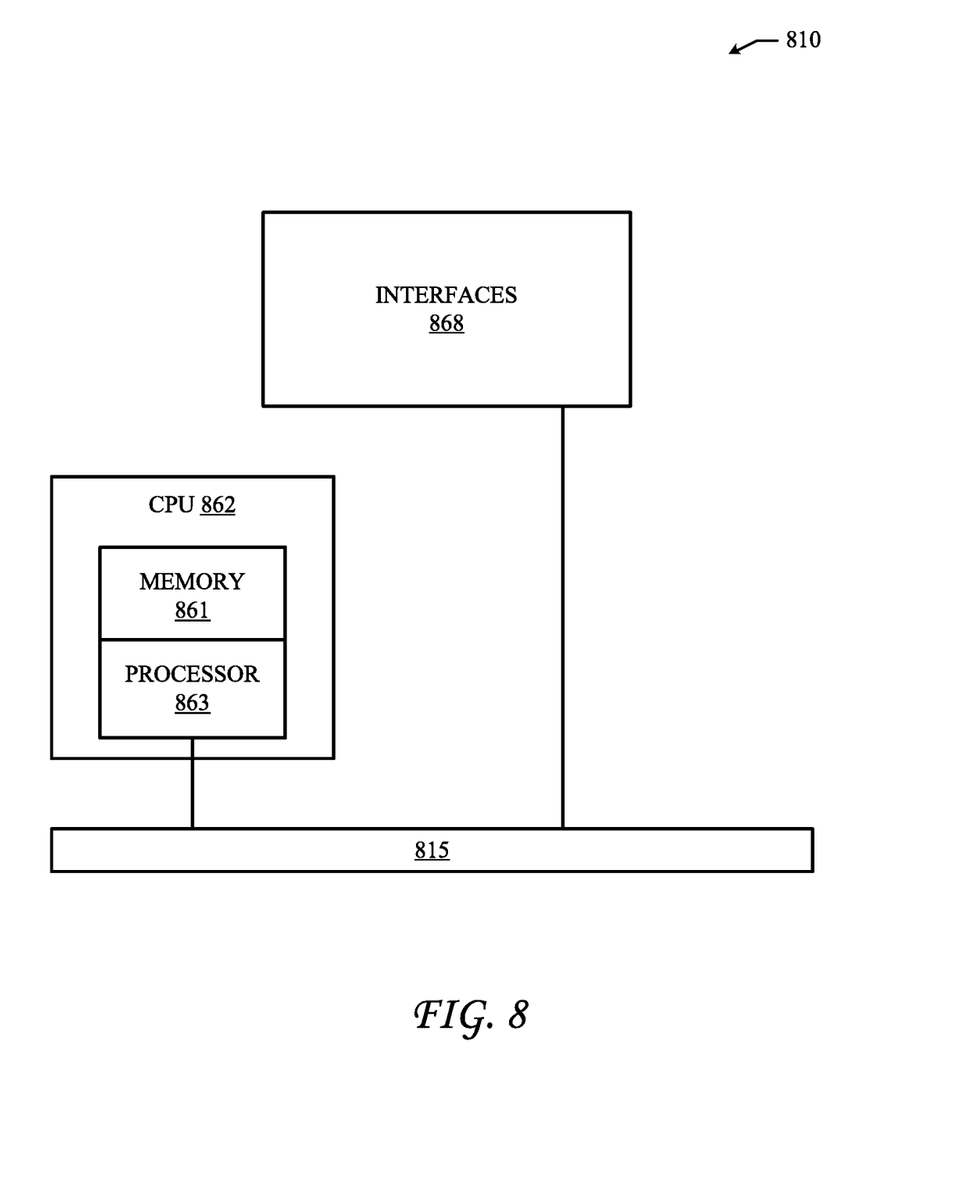
FIG. 8 illustrates example hardware components that can be used to implement some aspects of the subject technology.

FIG. 8 illustrates an example network device 810 according to some embodiments. Network device 810 can be used to implement a coordination server, and/or one or more agents, as discussed in the above examples.

Network device 810 includes a master central processing unit (CPU) 862, interfaces 868, and bus 815 (e.g., a PCI bus). When acting under the control of appropriate software and/or firmware, CPU 862 is responsible for executing packet management, error detection, and/or routing functions. CPU 862 preferably accomplishes all these functions under the control of software including an operating system and any appropriate applications software. CPU 862 can include one or more processors 863 such as a processor from the Motorola family of microprocessors or the MIPS family of microprocessors. In an alternative embodiment, processor 863 is specially designed hardware for controlling the operations of router 810. In a specific embodiment, a memory 861 (such as non-volatile RAM and/or ROM) also forms part of CPU 862. However, there are many different ways in which memory could be coupled to the system.

Interfaces 868 can be provided as interface cards (sometimes referred to as "line cards"). Generally, they control the sending and receiving of data packets over the network and sometimes support other peripherals used with the router 810. Among the interfaces that can be provided are Ethernet interfaces, frame relay interfaces, cable interfaces, DSL interfaces, token ring interfaces, and the like. In addition, various very high-speed interfaces can be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 8 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 861) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 9A:
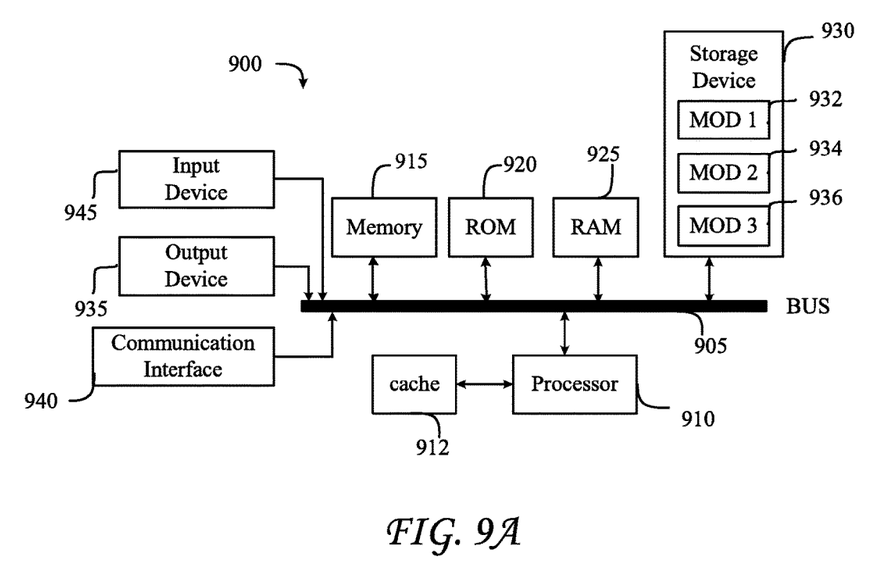
FIGS. 9A and 9B further illustrate example hardware components that can be used to implement some aspects of the technology.
Figure 9B:
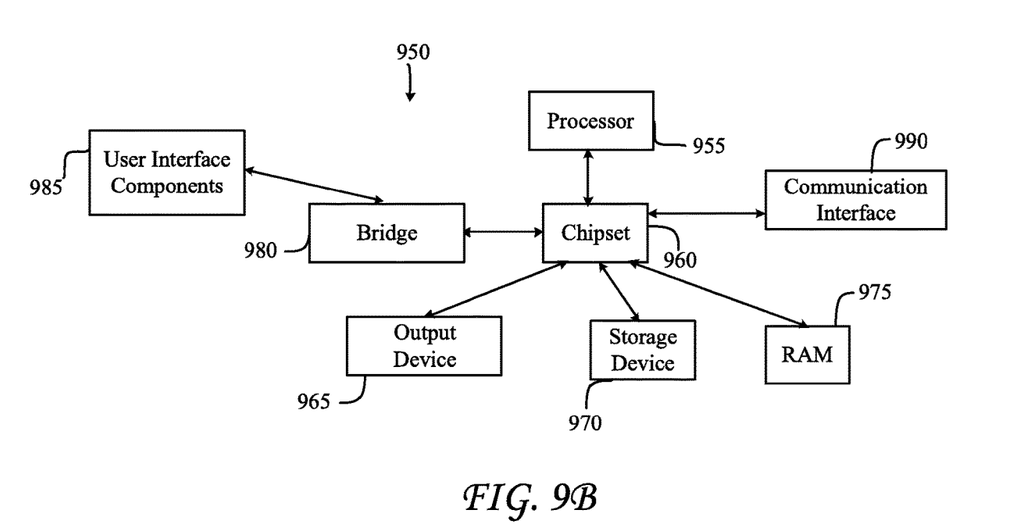

FIG. 9A and FIG. 9B illustrate example system embodiments. The more appropriate embodiment will be apparent to those of skill in the art when practicing the present technology. Persons of ordinary skill in the art will also readily appreciate that other system embodiments are possible. FIG. 9A illustrates a system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 can be available for use as well.

Memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor can be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B illustrates an example computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output device 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that example systems 900 and 950 can have more than one processor 910 or be part of a group or cluster of computing devices networked together to provide greater processing capability.

Although the exemplary embodiment described herein employs storage device 460, it should be appreciated by those skilled in the art that other types of computer readable media which can store data that are accessible by a computer, such as magnetic cassettes, flash memory cards, digital versatile disks, cartridges, random access memories (RAMs) 450, read only memory (ROM) 440, a cable or wireless signal containing a bit stream and the like, may also be used in the exemplary operating environment. Non-transitory computer-readable storage media expressly exclude media such as energy, carrier signals, electromagnetic waves, and transitory signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 420. The functions these blocks represent may be provided through the use of either shared or dedicated hardware, including, but not limited to, hardware capable of executing software and hardware, such as a processor 420, that is purpose-built to operate as an equivalent to software executing on a general purpose processor. For example, the functions of one or more processors may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 440 for storing software performing the operations discussed below, and random access memory (RAM) 450 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 400 can practice all or part of the recited methods, can be a part of the recited systems, and/or can operate according to instructions in the recited non-transitory computer-readable storage media. Such logical operations can be implemented as modules configured to control the processor 420 to perform particular functions according to the programming of the module.

For example, FIG. 4 illustrates three modules Mod1 462, Mod2 464 and Mod3 466 that are modules configured to control the processor 420. These modules may be stored on the storage device 460 and loaded into RAM 450 or memory 430 at runtime or may be stored as would be known in the art in other computer-readable memory locations.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A coordination server configured to coordinate distribution of an incremental machine learning model, the coordination server comprising:
   one or more processors;
   a network interface coupled to the one or more processors; and
   a memory coupled to the one or more processors, the memory comprising instructions stored therein, which when executed by the processors, cause the processors to perform operations comprising:
      receiving a first machine learning model via a first coordination agent, the first machine learning model based on a first training data set corresponding with a first sovereign region;
      sending the first machine learning model to a second coordination agent in a second sovereign region, wherein the second sovereign region is different from the first sovereign region; and
      receiving a second machine learning model from the second coordination agent, wherein the second machine learning model is based on updates to the first machine learning model using a second training data set corresponding with the second sovereign region;
      wherein the first sovereign region maintains export controls that prevent the first training set being sent to the coordination server and the second sovereign region;
      wherein the second sovereign region maintains export controls that prevent the second training set being sent to the coordination server and the first sovereign region.

2. The coordination server of claim 1, wherein the processors are further configured to perform operations comprising:
   sending the second machine learning model to a third coordination agent located in a third sovereign region, wherein the third sovereign region is different from each of the first sovereign region and the second sovereign region; and
   receiving a third machine learning model from the third coordination agent, wherein the third machine learning model is based on updates to the second machine learning model using a third training data set corresponding with the third sovereign region.

3. The coordination server of claim 1, wherein the first coordination agent is located within the first sovereign region, and the second coordination agent is located within the second sovereign region.

4. The coordination server of claim 1, wherein the first training data set is comprised of data for one or more users within the first sovereign region.

5. The coordination server of claim 1, wherein the first machine learning model is an incremental machine learning model initially configured using a first training data set, and subsequently updated using a first new data set.

6. The coordination server of claim 1, wherein the first machine learning model is configured to implement at least one of: a Naive Bayes classifier, a Bernoulli naive Bayes classifier, a Perceptron, a Stochastic Gradient Descent classifier, and a Passive Aggressive Classifier.

7. The coordination server of claim 1, wherein the first machine learning model is configured to implement one or more of: a Stochastic Gradient Descent Regressor, and a Passive Aggressive Aggressor.

8. A computer-implemented method comprising:
   receiving, at a coordination server, a first machine learning model via a first coordination agent, the first machine learning model based on a first training data set corresponding with a first sovereign region;
   sending, by the coordination server, the first machine learning model to a second coordination agent in a second sovereign region, wherein the second sovereign region is different from the first sovereign region; and
   receiving, by the coordination server, a second machine learning model from the second coordination agent, wherein the second machine learning model is based on updates to the first machine learning model using a second training data set corresponding with the second sovereign region;
   wherein the first sovereign region maintains export controls that prevent the first training set being sent to the coordination server and the second sovereign region;
   wherein the second sovereign region maintains export controls that prevent the second training set being sent to the coordination server and the first sovereign region.

9. The method of claim 8, further comprising:
   sending, by the coordination server, the second machine learning model to a third coordination agent located in a third sovereign region, wherein the third sovereign region is different from each of the first sovereign region and the second sovereign region; and
   receiving a third machine learning model from the third coordination agent, wherein the third machine learning model is based on updates to the second machine learning model using a third training data set corresponding with the third sovereign region.

10. The method of claim 8, wherein the first coordination agent is located within the first sovereign region, and the second coordination agent is located within the second sovereign region.

11. The method of claim 8, wherein the first training data set is comprised of data for one or more users within the first sovereign region.

12. The method of claim 8, wherein the first machine learning model is an incremental machine learning model initially configured using a first training data set, and subsequently updated using a first new data set.

13. The method of claim 8, wherein the first machine learning model is configured to implement at least one of: a Naive Bayes classifier, a Bernoulli naive Bayes classifier, a Perceptron, a Stochastic Gradient Descent classifier, and a Passive Aggressive Classifier.

14. The method of claim 8, wherein the first machine learning model is configured to implement one or more of: a Stochastic Gradient Descent Regressor, and a Passive Aggressive Aggressor.

15. A non-transitory computer-readable storage medium comprising instructions stored therein, which when executed by one or more processors, cause the processors to perform operations comprising:
   receiving, at a coordination server, a first machine learning model via a first coordination agent, the first machine learning model based on a first training data set corresponding with a first sovereign region;
   sending, by the coordination server, the first machine learning model to a second coordination agent in a second sovereign region, wherein the second sovereign region is different from the first sovereign region; and
   receiving, by the coordination server, a second machine learning model from the second coordination agent, wherein the second machine learning model is based on updates to the first machine learning model using a second training data set corresponding with the second sovereign region;

wherein the first sovereign region maintains export controls that prevent the first training set being sent to the coordination server and the second sovereign region;

wherein the second sovereign region maintains export controls that prevent the second training set being sent to the coordination server and the first sovereign region.

16. The non-transitory computer-readable storage medium of claim 15, further comprising:

sending, by the coordination server, the second machine learning model to a third coordination agent located in a third sovereign region, wherein the third sovereign region is different from each of the first sovereign region and the second sovereign region; and receiving a third machine learning model from the third coordination agent, wherein the third machine learning model is based on updates to the second machine learning model using a third training data set corresponding with the third sovereign region.

17. The non-transitory computer-readable storage medium of claim 15, wherein the first coordination agent is located within the first sovereign region, and the second coordination agent is located within the second sovereign region.

18. The non-transitory computer-readable storage medium of claim 15, wherein the first training data set is comprised of data for one or more users within the first sovereign region.

19. The non-transitory computer-readable storage medium of claim 15, wherein the first machine learning model is an incremental machine learning model initially configured using a first training data set, and subsequently updated using a first new data set.

20. The non-transitory computer-readable storage medium of claim 15, wherein the first machine learning model is configured to implement at least one of: a Naive Bayes classifier, a Bernoulli naive Bayes classifier, a Perceptron, a Stochastic Gradient Descent classifier, and a Passive Aggressive Classifier.

* * * * *